United States Patent [19]

Buente

[11] E Patent Number: Re. 32,167

[45] Reissued Date of Patent: Jun. 3, 1986

[54] ACTING VALVE GEAR

[75] Inventor: Stephen M. Buente, Battle Creek, Mich.

[73] Assignee: Eaton Corporation, Cleveland, Ohio

[21] Appl. No.: 690,713

[22] Filed: Jan. 11, 1985

Related U.S. Patent Documents

Reissue of:

[64] Patent No.: 4,367,701
Issued: Jan. 11, 1983
Appl. No.: 100,690
Filed: Dec. 5, 1979

[51] Int. Cl.[4] ..... F01L 1/14; F01L 1/24

[52] U.S. Cl. ..... 123/90.55; 123/90.51

[58] Field of Search ..... 123/90.48, 90.51, 90.55, 123/90.56, 90.57, 90.58, 90.59

[56] References Cited

U.S. PATENT DOCUMENTS

| | | | |
|---|---|---|---|
| 2,880,710 | 4/1959 | O'Neill | 123/90.55 |
| 3,509,858 | 5/1970 | Scheibe et al. | 123/90.55 |
| 3,877,446 | 4/1975 | Morgan | 123/90.55 |
| 4,270,496 | 6/1981 | Narasimhan et al. | 123/90.51 |
| 4,483,281 | 11/1984 | Black | 123/90.55 |

FOREIGN PATENT DOCUMENTS

| | | | |
|---|---|---|---|
| 2209926 | 9/1972 | Fed. Rep. of Germany | 123/90.51 |
| 2158156 | 5/1973 | Fed. Rep. of Germany | 123/90.51 |
| 2754446 | 6/1979 | Fed. Rep. of Germany | 123/90.55 |
| 0903983 | 8/1962 | United Kingdom | 123/90.55 |

*Primary Examiner*—W. R. Wolfe

*Attorney, Agent, or Firm*—C. H. Grace; R. A. Johnston

[57] ABSTRACT

A bucket tappet is provided for direct-acting valve gear having a body portion formed of a light weight material having a thermal expansion suitable for use in an aluminum engine head. The body of the tappet is formed with a tubular wall, an inner tubular hub and a transverse web joining and supporting the hub within the outer tubular wall. An hydraulic lash adjusting piston/-plunger assembly formed of steel is received within the tubular hub. The leakdown control surfaces within the lash adjuster are formed on the mating interfaces between the steel piston and plunger. The body of the tappet has a cam face member formed of hardened material, preferably iron base, received thereover transversely of the outer tubular portion and retained thereon for providing a cam contacting surface. The inner tubular hub has the end adjacent the cam face closed by portions of the body for forming a portion of the hydraulic reservoir in conjunction with a cavity formed in the hydraulic piston. The outer periphery of the light weight body has a hardened surface adapted for wear-resistant sliding contacting with a guide bore formed in the aluminum engine head.

9 Claims, 8 Drawing Figures

ACTING VALVE GEAR

Matter enclosed in heavy brackets [ ] appears in the original patent but forms no part of this reissue specification; matter printed in italics indicates the additions made by reissue.

*This is a reissue of application Ser. No. 100,690, filed Dec. 5, 1979, now U.S. Pat. No. 4,367,701.*

BACKGROUND OF THE INVENTION

Valve gear of the type known as direct-acting valve gear employs tappets having one end thereof contacting the engine cam shaft with the other end of the tappet in direct contact with the end of the stem of the combustion chamber valve. Direct acting valve gear offers the advantage of low mass, fewer working parts and higher stiffness due to the elimination of the rocker arm and/or push rods. Low mass and high stiffness result in a high natural resonent frequency which allows the valve gear to attain higher rpm's before valve mis-motion occurs. Direct acting valve gear also permits the use of lighter valve spring loads for a given valve motion and engine speed as compared with those used in other valve gear arrangements. The low mass and high stiffness of the system also permits valve lift velocities and accelerations which increase the area under the valve lift curve and thus provide increased specific engine output. Although other overhead cam configurations can be made to have comparable lift velocities and accelerations, a direct acting valve gear arrangement offers the additional advantage of permitting rotation of the cam contacting surfaces as the lifter rotates which is not possible with rocker arm type valve gear arrangements. Direct acting valve gear arrangements, therefore, allow higher permissible cam contact stresses.

In addition, the cam profile for other overhead cam valve gear arrangements with high lift accelerations and velocities is more complex than that required for direct acting valve gear. The simpler cam profile requirement of direct acting valve gear results in less manufacturing difficulties and less cost in the valve gear when high velocities and accelerations are desired.

Tappets for direct-acting valve gear are received in a guide bore provided in the engine above the combustion chamber and reciprocated therein in a film of engine lubricant provided to the guide bore. Tappets for direct acting valve gear must have a sufficient diameter to shroud the valve spring and provide adequate lift. Accordingly, tappets for direct acting valve gear generally have a length-to-diameter ratio of an order of magnitude of one. When the tappet bore is formed in cast iron, the body of the tappet may be formed from a suitable iron based material, or alloy steel, to match the hardness and thermal expansion properties of the guide bore.

It has long been desired to find a way to provide a tapped for direct acting valve gear of substantially lower weight than iron or steel and yet provide a tappet having similar durability and wear properties. Lower weight tappets permit greater valve acceleration for a given valve spring load.

Moreover, where the engine combustion chamber head is formed of aluminum it is desirable that the tappet for such a direct-acting valve gear application match the surface wear and thermal expansion properties of the aluminum engine head in order to prevent excessive oil flow at engine operating temperatures.

Tappets or iron or steel possess the requisite durability and surface wear resistance, but exhibit a substantially lesser coefficient of thermal expansion. Thus, if the iron or steel tappets are optimally sized to the tappet guide bore when the engine is cold, upon the engine reaching normal operating temperatures, the tappet will fit loosely in the guide bore. Conversely, if an iron or steel tappet is optimally sized to fit the tappet guide bore in the aluminum engine head at normal engine operating temperatures, assembly at room temperature will be impossible because of an interference fit. Furthermore, if the assembly is performed with the engine head at normal engine operating temperatures and optimal clearances, the tappet will be seized in the guide bore upon the engine cooling after such assembly.

It has, therefore, been desirable to find a way to provide hydraulic lash adjusting tappets for direct-acting valve gear in engines having combustion chamber heads of aluminum or similar light weight high-thermal expansion type materials. It has further been desired to provide a hydraulic lash adjusting tappet for direct acting valve gear with engines having aluminum heads in which the tappet will be capable of operating against a cam shaft formed of hardened iron base material. This generally requires that the cam face of the light weight tappet be compatable in hardness and wear properties with the hardened face of the cam lobe. Furthermore, it has been desired to find a way to economically and conveniently provide in such an hydraulic lash adjusting tappet a controlled leak-down clearance, yet provide a light weight tappet body.

SUMMARY OF THE INVENTION

The present invention provides an hydraulic lash adjusting tappet of the type used in direct-acting valve gear for internal combustion engines operating at high rpm. The hydraulic tappet of the present invention is of the type having a general configuration known as a "bucket" tappet where the body of the tappet has a diameter substantially larger than that of the hydraulic plunger contained therein. The tappet of the present invention has the greater mass, or body, portion thereof having the outer periphery thereof provided with a hard surface for being slidably received in direct contact with a guide bore formed in an aluminum engine head. The tappet of the present invention contains a hydraulic lash adjusting unit in the form of a plunger-piston assembly formed of steel and employs a one-way valve means and a high pressure oil chamber therein for providing lash adjustment.

A reservoir is formed in the aluminum body in the region surrounding one end of the plunger assembly. The tappet of the present invention has a hardened iron base or steel alloy member provided on the cam face of the tappet for wear resistance and compatability with the driving surface of a hardened iron-base engine cam. This construction enables the tappet to be slidably compatible with guide bore and further to match the thermal expansion characteristics of the aluminum engine head to maintain the proper running clearance between the tappet and the guide bore for necessary directional control and lubrication between the sliding surfaces without excessive oil flow at high temperatures.

The body of the present tappet has a generally tubular outer wall construction having a wear resistant surface on the outer periphery thereof. The body has an annular hub disposed within the outer wall and spaced therefrom with an end wall attached thereto and extending across one end of the hub. A web structure extends inwardly from the annular wall to support the hub. A hardened cam face member is provided and retained on the body to provide a cam face for the tappet. The hydraulic plunger and piston assembly is received in the inner hub and a portion of the hydraulic reservoir is formed between the inside face of the web, the end of the piston and the inner periphery of the hub. This unique construction provides for relatively large diameter of the outer periphery of the tappet body, yet provides for ease of manufacturing in that the outer wall, hub and web may be formed integrally. The hydraulic lash adjusting plunger assembly is preassembled and inserted into the hub and retained therein.

The unique construction of the present tappet further provides an arrangement wherein the tightly controlled leakdown surfaces between the piston and plunger of the lash adjusting unit are formed in the iron base or steel parts. The use of the intermediate plunger therefore makes the use of a light weight body practical over the range of normal engine operating temperatures. The present invention thus provides solution to the problem of providing a light weight tappet for using in direct acting valve gear and one that is compatable with material of an aluminum engine head and functionally compatable with the hardened iron base engine cam shaft while providing adequate wear resistant leak-down surfaces.

DETAILED DESCRIPTION

Figure 1:
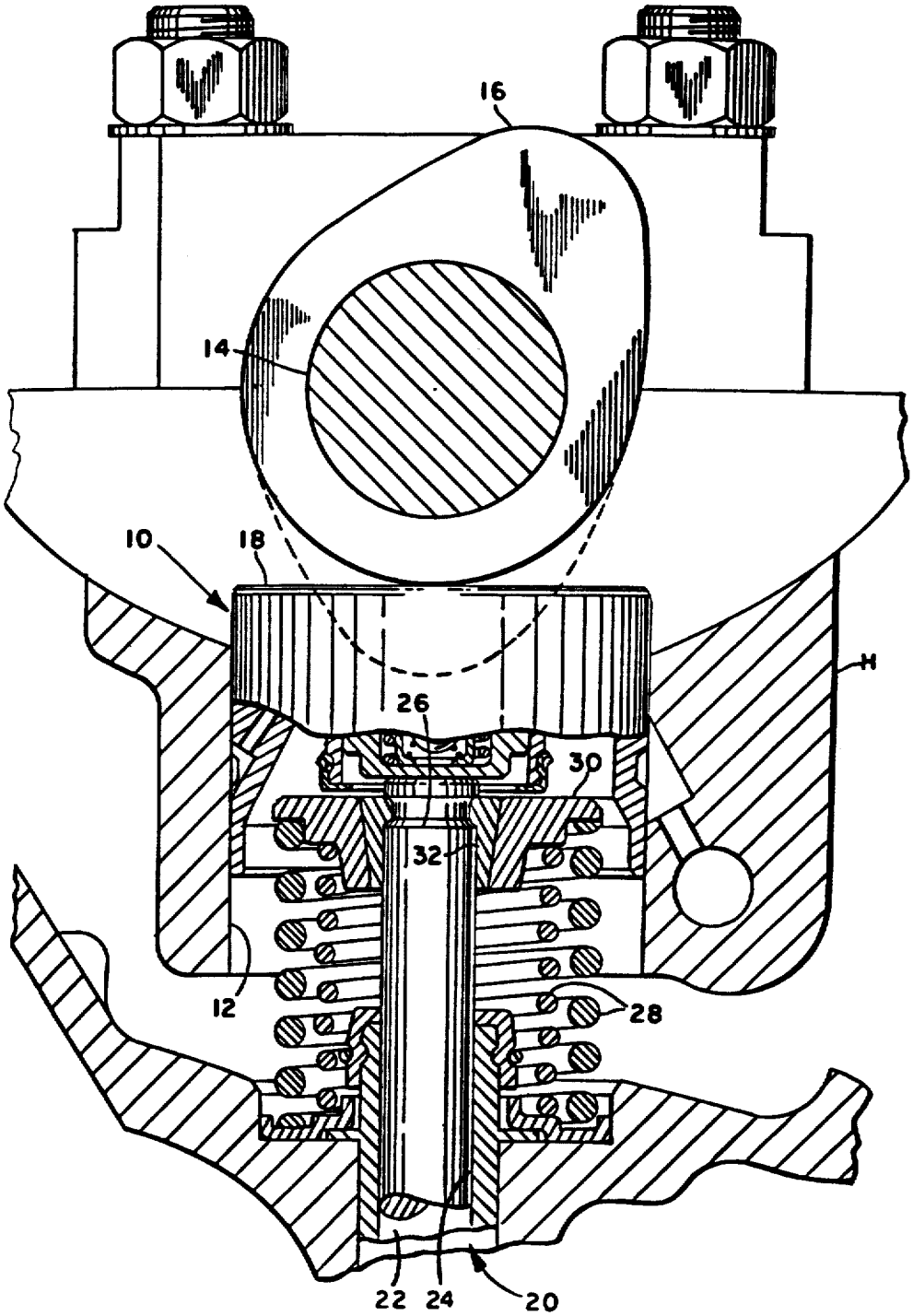
FIG. 1 is a cross sectional portion of the direct-acting valve gear of an internal combustion engine illustrating the tappet as installed in the engine.

Referring to FIG. 1, tappet 10 is slidably received in guide bore 12 provided in the cylinder head H of the engine structure. The cam shaft 14 having a cam lobe 16 contacts the upper end or cam face 18 of the tappet. A typical combustion chamber valve 20 is shown seated on a valve seating surface formed in the cylinder head H, with the stem portion 22 of the valve extending substantially vertically upward through a valve guide 24 formed in the cylinder head H, with the upper end 26 of the valve stem contacting the lower end of the tappet. The valve is biased to the closed position by valve springs 28 having their lower ends registered against the exterior of the upper portion of valve guide 24 and their upper ends in contact with a retainer 30 secured to the valve stem adjacent its upper end and retained thereon in a suitable manner as, for example, by the use of a split keeper 32, which is well known in the art.

Figure 2:
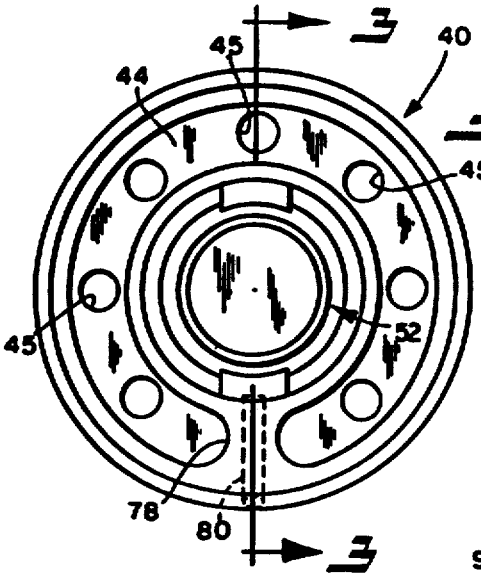
FIG. 2 is an end view of the plunger end of the preferred embodiment of the hydraulic tappet of the present invention.
Figure 3:
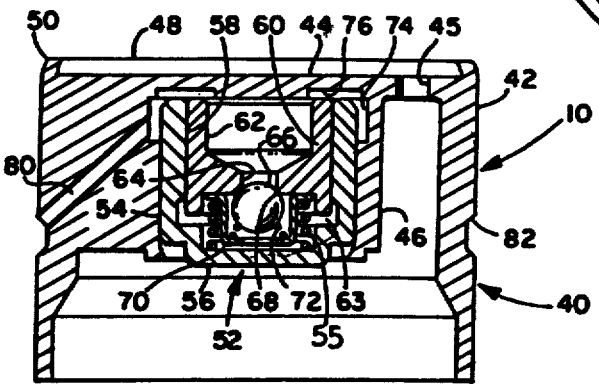
FIG. 3 is a cross section taken along section indicating lines 3—3 of FIG. 2 and shows the tappets with the hydraulic lash adjusting means assembled therein.

Referring now to FIGS. 2 and 3, the presently preferred embodiment of the tappet 10 is shown wherein the body, indicated generally at 40, is shown as formed preferably integrally with an outer tubular wall portion 42 having a transverse web 44 extending generally radially inwardly from the inner periphery of the outer tubular wall portion at a location adjacent the upper end thereof. The web 44 has formed preferably integrally therewith a tubular hub portion 46 extending axially from the web in a downward direction with respect to FIG. 3. The web 44 isolates hydraulic pressure inside hub 46 from wear face 48. The hub 46 has the inner periphery thereof extending in generally parallel relationship to the outer periphery of the tubular wall portion 42. The outer periphery of the tubular wall portion 42 is sized to be received in the tappet guide bore 12 (FIG. 1) in a generally closely fitting relationship.

In the presently preferred practice of the invention the outer wall portion, web and hub are formed integrally of a suitable light weight material having a coefficient of thermal expansion of at least $22.0\times10^{-6}$ per unit length per degree centigrade as measured in the range 20 to 100 degrees centigrade. The outer surface of the tubular wall portion has a wear resistant surface formed thereon as, for example, by anodic hard coating electroless metal plating, or the surface of a high silicon aluminum alloy in order to have a surface hardness value of at least 8 (TOPAZ) as measured on the MOHS scale. In the presently preferred practice the integrally formed body, web and hub are formed of an aluminum material having the outer surface of the tubular wall portion hardened to a depth of at least 0.002 in. ($7.9\times10^{-5}$ mm). In the presently preferred practice of the invention the body 40 of the tappet is formed of a material having a bulk density less than 2.85 grams per cubic centimeter.

A cam face member 48 having a relatively thin disc-shaped configuration is provided and is received over the upper face of the web and preferably retained thereon as, for example, by spinning or rolling an annular flange 50 inwardly over the edge of the cam face member 48. It will be understood however that other expedients may be employed for attachment of the member 48. Or alternatively, the cam face member 48 may be loose with respect to the body and assembly thereover upon installation of the tappet into the engine guide bore 12 and retained thereon by the cam since hydraulic forces are not acting on face 48. In the presently preferred practice of the invention, the cam face member is formed of material having a bulk density not less than 7.5 grams per cubic centimeter, and a surface hardness value on the upper face thereof of at least 89 as measured on the Rockwell 15 N scale for a minimum effective depth of at least 0.012 in (0.3 mm). However, it will be understood that materials having a bulk density less than 7.5 grams per cubic centimeter may be employed for the cam face member provided the surface hardness thereof is maintained. The cam face member is preferably formed of an iron base material as, for example, a steel alloy having a desired amount of chromium added thereto for providing a desired corrosion resistance; however, a suitably hard ceramic or cermet material may alternatively be employed for the member 48 if desired. In the presently preferred practice of the invention, the body member 40 preferably has a bulk density less than 40% of the bulk density of the cam face member although the bulk density ratio of the body member 40 to the bulk density of the cam face member 48 can be greater than 40% if a suitably hard light weight material is employed for the cam face member.

The body 40 has a hydraulic lash adjusting unit indicated generally at 52 slidably received in the inner periphery of the hub 46 in a generally closely fitting relationship. The hydraulic lash adjusting unit comprises a generally cup-shaped plunger member 54 having the open end thereof disposed adjacent the web portion 44 and the closed end extending axially slightly downward from the lower end of hub 46 and transversely thereacross to provide a reaction surface 56 for contacting the valve stem end 26 (see FIG. 1). The plunger 54 has a precision bore 58 provided on the inner periphery thereof which bore is maintained to tight tolerances of diameter, circularity, and surface finish. The plunger has received therein in precision sliding contact therein a piston member 60 having the outer periphery thereof sized to innerfit the plunger bore 58 in closely controlled clearance to provide control of the passage or leakdown of hydraulic fluid between the bore 58 and the piston 60. The piston 60 has a generally cup-shaped configuration with the open end thereof disposed upwardly adjacent the web 44 of body 40 and has an interior cavity 62 provided therein with a vertically extending passage 64 extending downwardly through the closed end of the piston 60. A one-way valve means in the form of check ball 66 is disposed to contact lower end periphery 68 of the passage 64 for which periphery 68 provides a valve seat for the check valve 66. The check valve is retained on the piston 60 by a cage 70 attached to the lower end of the piston 60. A conical spring 72 is provided between the cage and the check ball for biasing the check valve 66 to the closed position against valve seat 68.

An annular recess 74 is provided in the inner periphery of the hub 46 of body 40 adjacent the upper or web end thereof for providing a portion of a reservoir for hydraulic fluid. At least one bypass passage 76 is provided preferably for communicating the annular recess 74 with the cavity 62 provided in the piston to provide a divided chamber hydraulic fluid reservoir for supplying the check valve 66, the reservoir communicating with the valve passage 64. A secondary web portion 78 is provided in the body 40 and extends radially inwardly from the tubular wall portion 42 to the hub 46 and has formed therethrough a hydraulic fluid passage 80 which communicates with annular recess 74 from a fluid collecting recess or groove 82 provided in the outer periphery of the tubular wall 42 of the body.

In operation, the valve 20 is biased in a closed position by spring 28 and upon rotation of the cam shaft in timed relationship to the events of the combustion chamber to the position shown in solid outline in FIG. 1 the upper surface of the tappet is registered against the base circle portion of the cam with lobe 16 wherein so as not to contact the upper or cam face of the tappet. Upon rotation of the cam shaft 14 to the position shown in dashed outline in FIG. 1, the cam lobe contacts the upper face 18 of the tappet, causing the tappet to move downwardly to the position indicated in dashed outline thereby opening combustion chamber valve. Upon subsequent rotation of the cam shaft to return to the solid outline position of FIG. 1, the valve event is complete and the valve is reseated on the valve seat.

Although the embodiment of FIG. 2 illustrates the invention in its presently preferred form wherein the web 44 of the body 40 has a plurality of weight reducing holes 45 provided thereabout in circumferentially spaced arrangement, it will be understood that other shapes and configurations may be employed for reducing the weight of the web portion 44. The web portion 44 in the presently preferred practice is solid in the region extending transversely across the upper end of the hub 46. However, it will be understood that the solid portion of the web across the end of hub 46 may be omitted if the cam face member 48 is fluidly sealed to the outer wall about its outer periphery and mechanically restrained against the force of the high-pressure hydraulic fluid.

In operation, with the engine cam lobe 16 in the position shown in FIG. 1, a plunger spring 55 aided by hydraulic pressure, urges the piston 60 in an upward direction maintaining the upper end thereof in contact with the undersurface of the web and urges the plunger 54 in the downward direction until the end face 56 thereof contacts the upper face 26 of the valve stem 22, thereby eliminating lash in the valve gear. This causes expansion of chamber 63 which draws open the check ball 66 to a position spaced from valve seat 68 thereby permitting flow into the chamber 63. Upon cessation of the expansion of chamber 63, the check ball 66 closes under the biasing of spring 72. Upon subsequent rotation of cam lobe 16, the ramp of the cam lobe begins to exert a downward force on the upper face of the tappet, tending to compress the piston 60 into the bore 58 in the plunger, which compression is resisted by fluid trapped in chamber 63. The fluid trapped in the chamber 63 prevents substantial movement of the piston 60 relative to the plunger 54 and transmits the motion through the bottom face 56 of the plunger onto the top 26 of the valve stem. It will be understood by those having ordinary skill in the art that a minor movement of the plunger with respect to the piston occurs, the magnitude of which is controlled by the amount of fluid permitted to pass through the aforesaid leakdown surfaces 58 and 54. The piston 60 and plunger 54 thus act as a rigid member transmitting further lifts of the cam lobe 16 for opening the valve.

Figure 4:
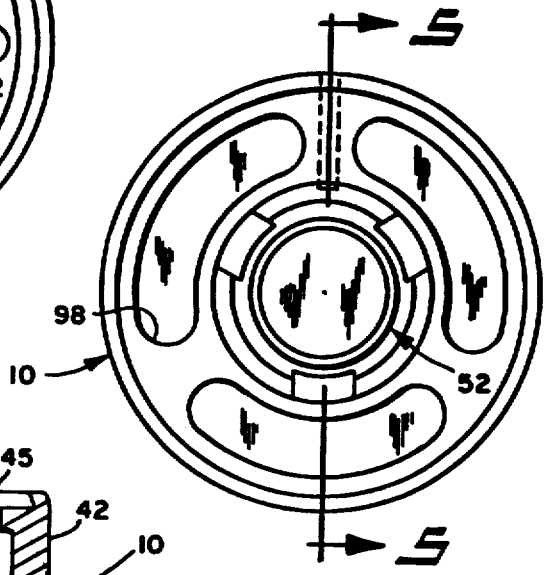
FIG. 4 is a view similar to FIG. 2 and shows an alternate embodiment of the tappet.
Figure 5:
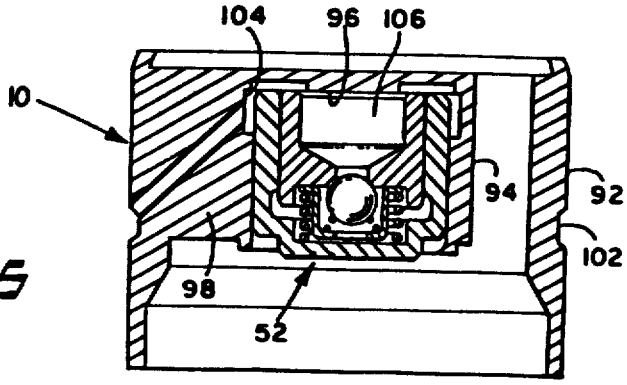
FIG. 5 is a section view taken along section indicating lines 5—5 of FIG. 4.

Referring now to FIGS. 4 and 5 an alternate embodiment of the tappet 10 of the present invention is illustrated as having a body indicted generally at 90 having an outer tubular portion 92, a tubular hub 94 disposed with the extending parallel to the outer periphery of the wall portion. The upper end of hub 94 being closed by a transverse wall 96 thereacross. The hub is supported within the outer wall portion 92 by a plurality of inwardly extending webs 98 disposed circumferentially thereabout in generally equally spaced relationship. In the embodiment of FIGS. 4 and 5 the webs 98 are similar to the secondary web 78 of embodiment of FIGS. 2 and 3. One of the webs 98 of the embodiment of FIGS. 4 and 5 has a fluid passage 100 provided therein for communicating from the lubricant receiving groove 102 on the outer periphery of the wall 92 with the annular portion 104 of the interioir fluid reservoir 106 provided within the lash adjuster 52. The opertion of the embodiment of FIGS. 4 and 5 is otherwise identical to that of embodiment of FIGS. 2 and 3.

Figure 6:
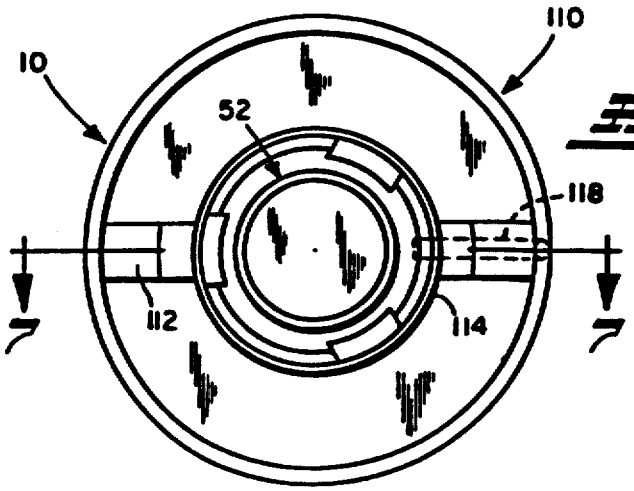
FIG. 6 is a view similar to FIG. 2 and shows a second alternate embodiment of the invention.
Figure 7:
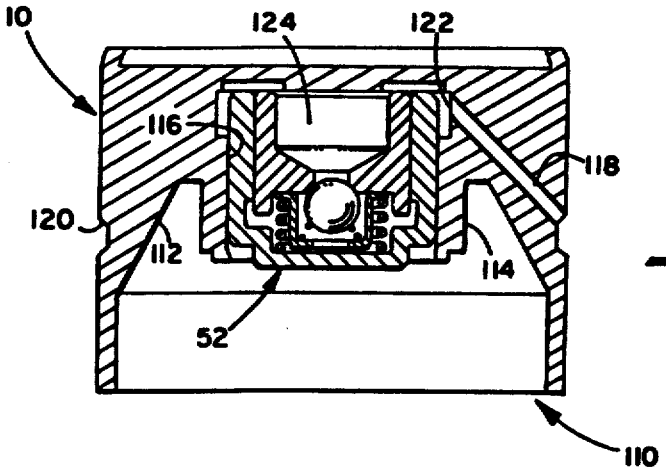
FIG. 7 is a section view taken along section indicating lines 7—7 of FIG. 6.

Referring now to FIGS. 6 and 7, the second embodiment of the tappet 10 is illustrated wherein the body indicated generally at 110 has an annular recess 112 provided in the lower end thereof which recess defines a portion of the wall of an axially downwardly extending hub 114 forming a portion of a bore 116 which has received therein the hydraulic lash adjusting unit 52 employed in the embodiments of FIGS. 2 through 5.

The embodiment of FIGS. 6 and 7 employs a passage 118 from a lubricant collecting groove 120 formed in the outer periphery of the tappet for communicating with an annular portion 12 of an interior fluid reservoir 124. The embodiment of FIGS. 6 and 7 is otherwise operationally identical to that of the embodiment described above with reference to FIGS. 2 and 3.

In the embodiments described hereinabove with reference to the attached drawings, the hydraulic lash adjuster unit 52 may be retained in the hub portion of the body by any suitable expedient, as for example, by metal staking about the end face of the periphery of the hub.

Figure 8:
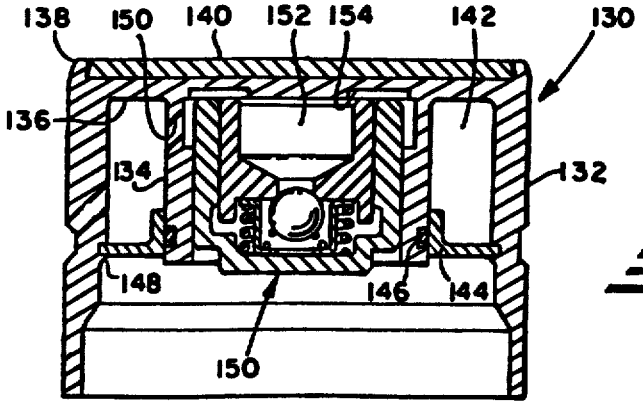
FIG. 8 is a view similar to FIG. 7 of an alternate embodiment of the tappet.

Referring now to FIG. 8, an alternate embodiment of the tappet 10 is illustrated wherein the body indicated generally at 130 comprises an outer tubular portion 132 and an inner tubular hub 134 disposed generally centrally therein with a web portion 136 extending radially inwardly from the outer tubular portion 132 and preferably formed integrally therewith adjacent the upper end thereof in FIG. 8, the web 136 connecting with the upper end of tubular hub 134 and extending transversely thereacross. In the presently preferred practice the body 130 is formed of aluminum having the outer periphery thereof formed of a hardened surface in the manner described with respect to the embodiments of FIGS. 1 through 7. An annular rim 138 is formed about the periphery of the outer tubular portion 132 at the upper edge thereof and a hardened cam face member 140 is received against the upper surface of web 136 and retained thereon by a suitable mechanical expedient as, for example, deformation of the rim 138 in a radially inward direction in a manner similar to that described with respect to the embodiments of FIGS. 1 through 7.

The hub 134, web 136 and outer tubular wall portion 132 thus form an annular region 142 which is closed at the lower end thereof by an annular insert 144 which is sealed against the outer periphery of hub 134 by means of a suitable sealing expedient as, for example, O-ring 146 received in a groove formed in the outer periphery of hub 134 adjacent and lower end thereof in FIG. 8. The outer periphery of the insert 144 is sealed about its outer periphery against the inner surface of the outer wall portion 132 by a suitable mechanical expedient as, for example, deformation of the material of the wall portion 132 by a lip 148 extending over the outer periphery of the insert 144.

The region 142 communicates with the interior of hub 134 via a passageway 150 formed through the wall of hub 134. The annular region 142 thus forms a portion of a fluid reservoir.

A lash adjusting assembly 151 is slidably received in the tubular hub 134, the lash adjusting assembly 151 being similar to the assembly 52 described hereinabove with respect to the embodiment of FIG. 2. The lash adjusting assembly 151 has therein a hollow region 152 formed in the piston thereof which region 152 comprises a portion of the fluid reservoir which communicates with the annular region 142 via bypass channels 154 formed in the lower surface of the web 136. In operation, the function of the lash adjuster reservoir and cam face member is similar to that of the embodiment of the invention described hereinabove with respect to FIGS. 1 through 7. The annular region 142 communicates with the extension of the wall 132 via passage 155 formed therethrough.

The novel construction of the present tappet provides lash adjustment by precision fit of a piston in a bore formed in the plunger slidably received in the hub and thus eliminates the need for precision fitting leakdown control surfaces on the interior of the tappet hub. The area surrounding the plunger between the web and the tubular wall of the body and the cam face member provides a reservoir for fluid to supply the one-way check valve with hydraulic lash adjustment. The tappet of the present invention provides a unique light weight tappet adapted for direct contact with the surfaces of a guide bore provided in an aluminum engine cylinder head. The body of the tappet of the present invention has the outer periphery thereof provided with a hard surface or hard coating to be slidably compatible with the properties of the aluminum engine head. The tappet is formed of a suitable light weight material having surface hardness properties compatable with those of the surface of the aluminum engine head and the tappet material matching the coefficient of thermal expansion of the aluminum engine head to maintain control of the clearances therebetween for providing proper guidance during reciprocation of the tappet and maintenance of an adequate lubricant film therebetween. The tappet of the present invention employs a hardened iron base cam face member attached to the body for wear resistant driving contact compatable with the surface of an engine cam formed of iron base material having a hardened surface.

Although the invention has been described and illustrated hereinabove, the presently preferred forms, it will be apparent to those having ordinary skill in the art that modifications and variations of the invention may be made and the invention is limited only by the following claims.

I claim:

1. An hydraulic lash adjusting tappet for use in the valve gear of an internal combustion engine, said tappet comprising:

(a) body means, including structure defining, (i) an outer annular wall having the outer periphery thereof forming a wear resistant surface;

(ii) an annular hub disposed within said annular wall and spaced therefrom, said hub having one end thereof closed and the annular inner periphery thereof disposed in generally parallel relationship to said wear surface;

(iii) a plurality of webs disposed in circumferentially spaced arrangement about said annular wall and with each web extending inwardly therefrom to said hub and joined thereto for supporting same, wherein said body means structure is formed of material having a coefficient of thermal expansion not less than $22\times10^{-6}$ per unit length per degree centigrage as measured in the range 20–100 degrees C.

(b) a face member having a cam face formed thereon, said member being disposed over said hub end and extending outwardly to said annular wall and being joined thereto, said face member being formed of material having surface hardness value of at least 89 as measured on the Rockwell 15 N scale for the cam face;

(c) hydraulic lash adjusting means movably received in the open end of said hub, said lash adjusting means including structure defining a reaction surface adapted for contacting associated components of the engine valve gear, said reaction surface extending generally parallel to said cam face and being movable with respect thereto, said lash adjusting means including means defining a fluid pressure chamber and one-way valve means operable to admit fluid to said chamber for altering the position of said reaction surface with respect to said cam face for lash adjustment in said valve gear, said lash adjusting means further including means biasing said reaction surface away from said cam face;

(d) said body means including structure defining a fluid passage from said wear resistant surface to said one-way valve means for communicating fluid thereto upon installation of said tappet in an engine and supplying pressurized fluid to said passage; and, (e) means retaining said lash adjusting means in said hub.

2. The tappet defined in claim 1, wherein said body means is formed of substantially aluminum material.

3. The tappet defined in claim 1, wherein said lash adjusting means includes structure cooperating with said body means to define a fluid reservoir communicating with said one-way valve means.

4. The tappet defined in claim 1, wherein said body means is formed of material having a density less than 2.85 grams per $cm^3$ hub structure, said annular wall and said web structure are integrally formed.

5. An hydraulic lash adjusting tappet for the valve gear of an internal combustion engine, said tappet comprising:

(a) body means including structure defining:

(i) an outer annular wall having a wear resistant surface on the outer periphery thereof;

(ii) an annular hub disposed within said outer wall and spaced therefrom, and, (iii) an end wall attached respectively to and extending transversely across one axial end of said hub, (iv) web structure extending inwardly from said outer annular wall and supporting said hub, wherein said body means is formed of material having a coefficient of thermal expansion of at least $22.0\times10^{-6}$ per unit length per degree centigrade as measured in the range 20–100 degrees C.;

(b) a member defining a cam face adapted to contact an engine cam, said face member being formed of material having a hardened surface adapted for contacting a cam;

(c) hydraulic lash adjusting means movably received in said hub, said lash adjusting means including structure defining a reaction surface adapted for contacting associated valve gear components, said reaction surface extending generally parallel to said cam face and being movable with respect thereto, said lash adjusting means including means defining a fluid pressure chamber and plunger means including piston structure cooperating with said web to form a first fluid chamber of a fluid reservoir, and said plunger means including plunger structure cooperating with portions of said hub to form a second chamber of a fluid reservoir, and one-way valve means operable to admit fluid to said chamber for altering the position of said reaction surface with respect to said cam face, said lash adjusting means further including means biasing said reaction surface away from said cam face, said web including structure defining at least one by-pass channel operable to communicate said first reservoir portion with said second reservoir portion for all positions of said piston structure and said plunger structure in said hub;

(d) said body means including structure defining a fluid passage through said tubular wall portion from said wear resistant surface to said second reservoir chamber and one-way valve means for communicating fluid thereto upon installation of said tappet in an engine and supplying pressurized fluid to said passage;

(e) means retaining said lash adjusting means in said hub.

6. The tappet defined in claim 5, wherein said fluid passage defining structure includes a radial web extending between said outer tubular wall and said hub.

7. The tappet defined in claim 5, wherein said body means structure is formed of material having a bulk density less than 2.85 grams per $cm^3$. '

8. The tappet defined in claim 5, wherein said face member is formed of steel and said body, means outer wall, hub and web are formed of substantially aluminum material.

*9. A hydraulic lash adjusting tappet for use in the valve gear of an internal combustion engine, said tappet comprising:*

*(a) a member defining a cam face, said member formed of material having a hardened surface adapted for contacting a cam;*

*(b) body means including structure defining:*

*(i) an outer annular wall having the outer periphery thereof forming a wear resistance surface;*

*(ii) at a web extending radially inwardly from said outer wall;*

*(iii) an annular hub disposed centrally within said outer wall and supported from said web, wherein said body means is formed of material selected from the group consisting of aluminum, material having a thermal expansion coefficient not less than* $22\times10^{-6}$ per unit length per degree centigrade as measured in the range 20–100 C., or material having a bulk modulus not greater than 2.85 grams per cubic centimeter

*(c) hydraulic lash adjusting means movably received in the open end of said hub, said lash adjusting means including structure defining a reaction surface adapted for contracting associated components of the engine valve gear, said reaction surface extending generally parallel to said cam face and being movable with respect thereto, said lash adjusting means including means defining a fluid pressure chamber and one-way valve means operable to admit fluid to said chamber for altering the position of said reaction surface with respect to said cam face for lash adjustment in said valve gear, said lash adjusting means further including means biasing said reaction surface away from cam face;*

*(d) said body means including structure defining a fluid passage from said wear resistant surface to said one-way valve means for communicating fluid thereto upon installation of said tappet in an engine and supplying pressurized fluid to said passage; and,*

*(e) means retaining said lash adjusting means in said hub.*

* * * * *